United States Patent [19]

Schmalenberger et al.

[11] Patent Number: 5,030,958
[45] Date of Patent: Jul. 9, 1991

[54] COPROCESSOR SYSTEM AND METHOD

[75] Inventors: Russell M. Schmalenberger; Jeffrey L. Wyman, both of Anaheim, Calif.

[73] Assignee: United States of America, Washington, D.C.

[21] Appl. No.: 411,159

[22] Filed: Sep. 11, 1989

[51] Int. Cl.$^5$ .......................................... H04R 7/185
[52] U.S. Cl. .................................. 342/358; 342/352; 342/125; 364/447
[58] Field of Search ............... 342/118, 120, 121, 122, 342/125, 352, 357, 358; 364/447, 454, 453, 449

[56] References Cited

U.S. PATENT DOCUMENTS

| | | | |
|---|---|---|---|
| 4,106,094 | 8/1978 | Land | 364/447 X |
| 4,232,313 | 11/1980 | Fleishman | 364/453 X |
| 4,402,049 | 8/1983 | Gray | 364/447 |
| 4,405,986 | 9/1983 | Gray | 364/453 X |
| 4,758,959 | 7/1988 | Thoone et al. | 364/454 |
| 4,899,285 | 2/1990 | Nakayama et al. | 364/453 |

Primary Examiner—Thomas H. Tarcza
Assistant Examiner—Tod Swann
Attorney, Agent, or Firm—Robert M. Wohlfarth; John P. Tarlano

[57] ABSTRACT

An improvement in a coprocessor system for correcting for drifts in directions of navigation gyros, by means of satellite navigation information from global positioning satellites. Values of gyro navigation information from the gyros are interpolated to values that are valid at a cycle time. A cycle time is a time when the satellite navigation information is valid. The interpolated gyro navigation information is coprocessed with the satellite navigation information to arrive at accurate gyro drift terms. The gyro drift terms are used in correcting for the drifts in the navigation gyros.

2 Claims, 3 Drawing Sheets

1(a).
$$A_k^{NCT} = A_k^{ESGN} \times \frac{\Delta t\, A1 \times \Delta t\, A3}{(\Delta t\, A2 + \Delta t\, A1)(\Delta t\, A2 + \Delta t\, A3)}$$
$$+ A_{k-1}^{ESGN} \times \frac{\Delta t\, A2 \times \Delta t\, A3}{(\Delta t\, A2 + \Delta t\, A1)(\Delta t\, A3 - \Delta t\, A1)}$$
$$+ A_{k-2}^{ESGN} \times \frac{\Delta t\, A2 \times \Delta t\, A1}{(\Delta t\, A2 + \Delta t\, A3)(\Delta t\, A1 - \Delta t\, A3)}$$

1(b).
$$V_k^{NCT} = V_k^{ESGN} \times \frac{\Delta t\, V1 \times \Delta t\, V3}{(\Delta t\, V2 + \Delta t\, V1)(\Delta t\, V2 + \Delta t\, V3)}$$
$$+ V_{k-1}^{ESGN} \times \frac{\Delta t\, V2 \times \Delta t\, V3}{(\Delta t\, V2 + \Delta t\, V1)(\Delta t\, V3 - \Delta t\, V1)}$$
$$+ V_{k-2}^{ESGN} \times \frac{\Delta t\, V2 \times \Delta t\, V1}{(\Delta t\, V2 + \Delta t\, V3)(\Delta t\, V1 - \Delta t\, V3)}$$

2. $$CV_k^{NCT} = V_k^{NCT} - \Delta V_{k-1}^{BIAS}$$

3. $$P_k^{NCT} = P_k^{ESGN} + (CV_k^{NCT} \times \Delta t\, P1)$$

4. $$P_k^{(-)} = P_{k-1}^{(+)} + (P_k^{NCT} - P_{k-1}^{NCT}) - (t_k - t_{k-1}) \cdot \Delta V_{k-1}^{BIAS}$$

5. $$V_k^{(-)} = CV_k^{ESGN}$$

GPS CORRECTIONS $\Delta P_k^{GPS}$ & $\Delta V_k^{GPS}$

6(a). $$P_k^{(+)} = P_k^{(-)} + \Delta P_k^{GPS}$$

6(b). $$V_k^{(+)} = V_k^{(-)} + \Delta V_k^{GPS}$$

7. $$\Delta V_k^{BIAS} = \Delta V_{k-1}^{BIAS} + \Delta V_k^{GPS}$$

8. OUTPUT $P_k^{(+)}$ & $V_k^{(+)}$

*FIG. 3*

COPROCESSOR SYSTEM AND METHOD

BACKGROUND OF THE INVENTION

A global positioning system (GPS) is known. It has no drift, but is some what unstable. The GPS uses signals obtained from satellites. It produces GPS information of position and velocity.

An electrostatic gyro navigation system is also known. The gyro system has drift, but is not noisy. The system uses signals obtained from gyros. It produces ESGN information of position, velocity and attitude.

The present invention relates to a coprocessor of GPS information and gyro system information. The coprocessor uses stable ESGN information and non-drifting GPS information. The coprocessor has an algorithm to combine the two sets of information to produce a better measure of velocity and distance that can be obtained with either of the two sets of information alone.

The general concept of the invention is that since a GPS does not have a drift factor while an ESGN does have a drift factor. The drift factor of the ESGN may be eliminated by using GPS information.

Values of small changes in position and velocity are sensed by an ESGN and modified to eliminate a drift factor by means of values of velocity and position as given by a GPS system. The resultant position and velocity values are increasingly accurate.

DESCRIPTION OF THE DRAWINGS

FIG. 3 is a drawing that lists major steps taken by an algorithm, to carry out the method of the present invention.

DESCRIPTION OF THE PREFERRED EMBODIMENT

Figure 1:
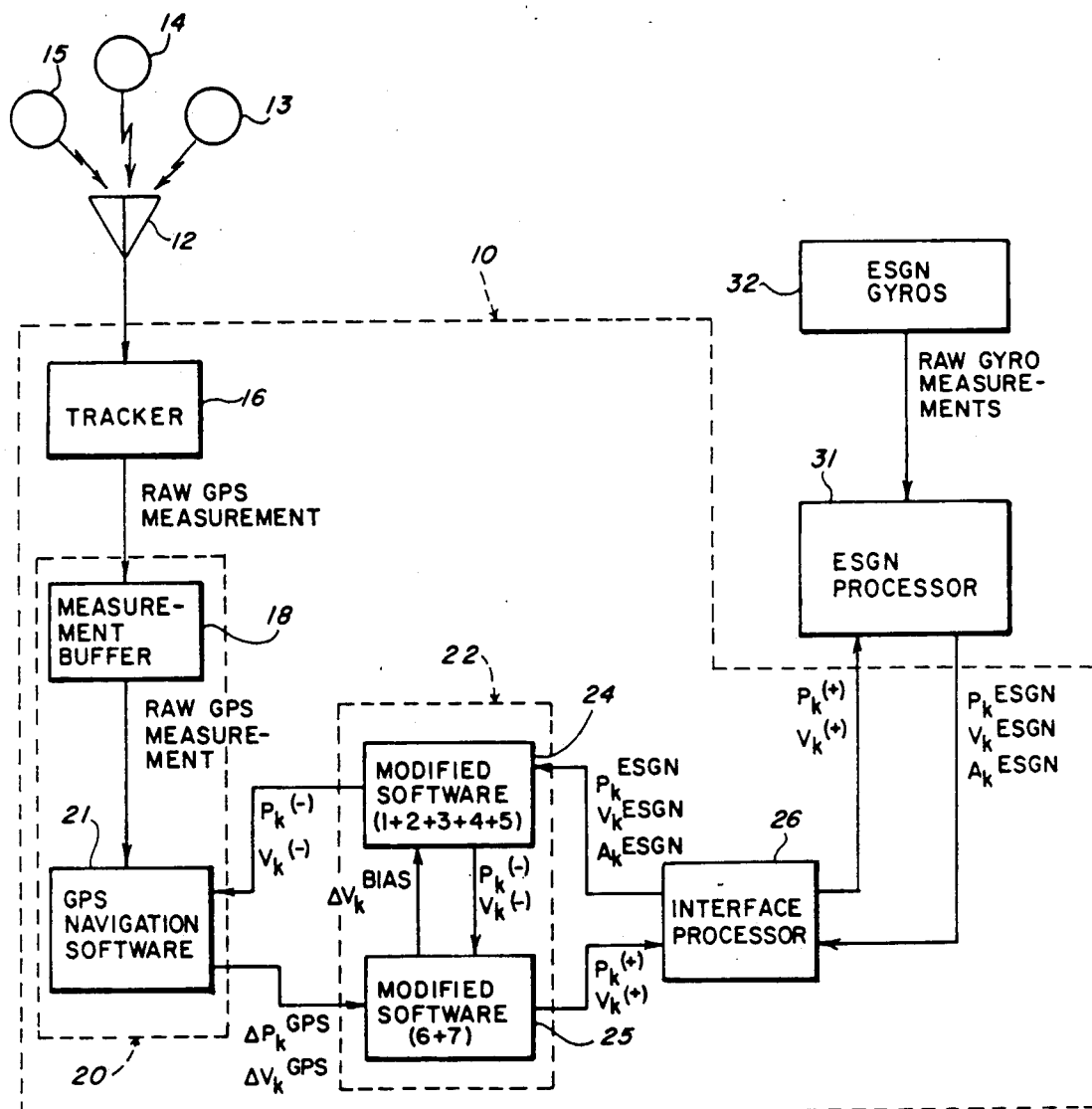
FIG. 1 is a block diagram of the coprocessor system of the present invention.

FIG. 1 shows a coprocessor system 10. The coprocessor 10 processes ESGN information and GPS information. The coprocessor 10 obtains global positioning signals, via antenna 12, from GPS satellites 14 and 15. A tracker 16 processes the antenna signals and produces GPS range measurements. The information is raw GPS information that is indicative of position and velocity at time 0.30 seconds (shown in FIG. 2). The coprocessor system 10 has a buffer 18 to store this set of information until it may be used by GPS processor 20. Processor 20 contains ordinary global positioning system software 21. This software 21 can combine GPS range measurements to produce position and velocity corrections in the normal fashion. A coprocessor 22 contains other modified software 24 that processes ESGN information and other software 25 that processes the GPS corrections and ESGN information. The coprocessor system has an interface processor 26 that communicates with ESGN processor 31. The final corrected position and velocity are sent to the ESGN processor 31 via the interface processor 26.

Raw gyro measurements are sent from gyros 32 to ESGN processor 31. The ESGN processor 31 produces information of position, attitude and velocity of a vehicle on which the gyros are located. The EGSN information is sent into interface processor 26. Interface processor 26 accepts the ESGN information and sends it into the modified software 22.

Figure 2:
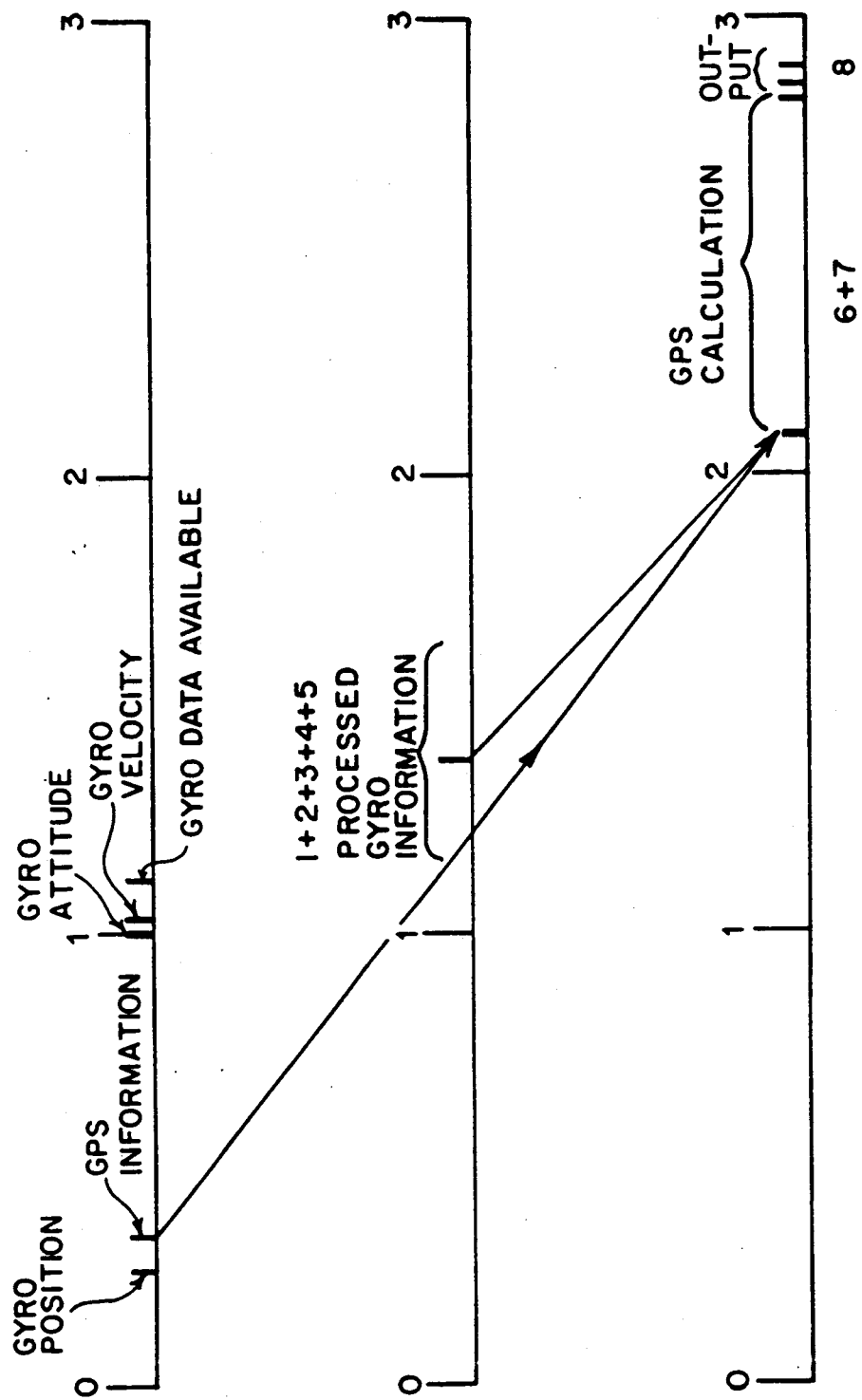
FIG. 2 is a diagram of times of arrival and coprocessing of GPS data and ESGN data.

FIG. 2 shows the times at which one may obtain information of a moving vehicle, by using a GPS system and an ESGN(Gyro) system. After interrogating these systems at zero time, GPS position and velocity that exists at 0.30 seconds, can be obtained at 0.30 seconds. ESGN position that exists at 0.25 seconds, ESGN attitude that exists at 1.0 seconds, and ESGN velocity that exists at 1.017 seconds, can simultaneously be obtained at 1.2 seconds. The information is located on the GPS and on the ESGN.

FIG. 2 shows a window of times of arrival of processed ESGN information into interface processor 26.

In view of the different times at which values of position and velocity are sensed by the ESGN and by the GPS, and the value of attitude is sensed by the ESGN, a complex algorithm is needed. The algorithm interpolates to values which the ESGN would give if it could sense position, attitude and velocity at the time that GPS senses values of position and velocity, namely at 0.3 seconds, The interpolation use the various available ESGN and GPS values.

The algorithm takes the following steps:

(1) The last three detected values of ESGN attitude and ESGN velocity are used in quadratic equations in order to extrapolate for ESGN attitude and ESGN velocity at the effective GPS time (NAV cycle time NCT) of 0.30 seconds.

(2) The accumulated correction to ESGN velocity bias is subtracted from the extrapolated ESGN velocity at 0.30 seconds to give a corrected ESGN velocity at 0.30 second.

(3) The detected ESGN position value is used and is extrapolated to be effective at the GPS time of 0.30 seconds by the distance that the ESGN would travel. This distance equals the bias modified velocity of the ESGN, CV(KNCT) times the time difference in detection of ESGN position and 0.30 seconds ($\Delta$tP1 equals 0.05 seconds).

(4) The ESGN position is updated by using previous GPS corrected ESGN position, adding calculated change in ESGN position over one sampling cycle, and subtracting the effect of a change in ESGN velocity bias over the last sampling cycle.

(5) The ESGN velocity is taken as the bias corrected ESGN velocity at 0.3 seconds.

(6a) Corrections to values of position and velocity are determined, using the global position system (GPS), over the last cycle time.

(6b) The position and velocity of the vehicle at 0.30 seconds is calculated by using bias modified ESGN position and bias modified ESGN velocity and adding GPS changes determined in 6(a) above.

(7) The change in ESGN velocity drift (bias) is updated by taking the last previously determined velocity bias and adding the latest GPS velocity corrections. The GPS velocity correction is due to GPS measurement processing that is valid at time K.

(8) The values of position and velocity, determined in 6(b) above, are output.

While the present invention has been disclosed in connection with the preferred embodiment thereof, it should be understood that there may be other embodiment, which fall within the spirit and scope at the invention as defined by the following claims.

What is claimed is:

1. A coprocessor system, comprising:

(a) antenna means located on a vehicle for sensing global positioning satellite signals;
(b) tracker means for converting the satellite signals to satellite range information;
(c) a buffer for storing the satellite range information for a period of time and releasing it;
(d) a GPS processor means for processing the released satellite range information, the processed satellite range information being available at a cycle time;
(e) electrostatic gyro navigation (ESGN) means located on the vehicle for sensing values of acceleration and attitude of the vehicle;
(f) ESGN processor means for processing the values of acceleration and attitude into attitude, position and velocity information, the processed attitude, position and velocity information being available at times other than the cycle time; and
(g) a coprocessor means having an algorithm therein, said algorithm having interpolation steps therein for interpolating the attitude, position and velocity information to values the attitude, position and velocity information would have at the cycle time and for then coprocessing the satellite range information and the interpolated attitude, position and velocity information to produce more precise position and velocity information.

2. A method of coprocessing ESGN system information and global positioning system information, comprising:
(a) gathering global positioning system based positioning and velocity information of a moving vehicle, on the vehicle, said global positioning system based information being available at a cycle time;
(b) gathering ESGN system based attitude, position and velocity information of a moving vehicle, on the vehicle, said ESGN system based information being available at times other than the cycle time; and
(c) coprocessing the global positioning system based information and the ESGN based information, on the vehicle, with the aid of an algorithm having interpolation steps therein for interpolating the ESGN system based information to values the ESGN based information would have at the cycle time and then coprocessing the global positioning system based information and the interpolated ESGN system based information in order to produce improved velocity and position information of the moving vehicle.

* * * * *